(12) United States Patent
Roh et al.

(10) Patent No.: US 9,355,615 B2
(45) Date of Patent: May 31, 2016

(54) APPARATUSES, SYSTEMS, AND METHODS FOR CONVERTING A DISPLAY DRIVER SYNC SIGNAL INTO AN IMAGE SENSOR SYNC SIGNAL

(71) Applicants: Jong-Ho Roh, Yongin-si (KR); Jae-Sop Kong, Gwacheon-si (KR)

(72) Inventors: Jong-Ho Roh, Yongin-si (KR); Jae-Sop Kong, Gwacheon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/451,029

(22) Filed: Aug. 4, 2014

(65) Prior Publication Data

US 2015/0062111 A1 Mar. 5, 2015

(30) Foreign Application Priority Data

Sep. 3, 2013 (KR) ........................ 10-2013-0105512

(51) Int. Cl.
*G09G 5/12* (2006.01)
*G06F 3/147* (2006.01)
*G09G 5/00* (2006.01)

(52) U.S. Cl.
CPC ........ *G09G 5/12* (2013.01); *G06F 3/147* (2013.01); *G09G 5/005* (2013.01); *G09G 2330/021* (2013.01); *G09G 2340/02* (2013.01); *G09G 2340/0435* (2013.01); *G09G 2360/18* (2013.01); *G09G 2370/04* (2013.01)

(58) Field of Classification Search
CPC ........................................................ G09G 5/12
See application file for complete search history.

(56) References Cited

U.S. PATENT DOCUMENTS

| | | | |
|---|---|---|---|
| 4,339,775 A * | 7/1982 | Lemke | H04N 3/1562 348/E3.02 |
| 4,496,995 A * | 1/1985 | Colles | H04N 5/77 386/221 |
| 7,420,618 B2 | 9/2008 | Swartz | |
| 9,041,783 B2 * | 5/2015 | Choi | H04N 13/0438 348/56 |
| 2002/0021364 A1 * | 2/2002 | Asada | H04N 5/232 348/312 |
| 2004/0017481 A1 | 1/2004 | Takasumi et al. | |
| 2004/0081437 A1 | 4/2004 | Asada et al. | |
| 2005/0036055 A1 | 2/2005 | Nakasuji et al. | |
| 2005/0212921 A1 * | 9/2005 | Horii | H04N 5/23293 348/211.14 |
| 2006/0256236 A1 | 11/2006 | Kume et al. | |
| 2007/0070212 A1 | 3/2007 | Haneda | |
| 2008/0151070 A1 * | 6/2008 | Shiozawa | H04N 5/23293 348/222.1 |
| 2008/0253692 A1 * | 10/2008 | Suematsu | H04N 19/132 382/300 |
| 2008/0297622 A1 * | 12/2008 | Miyashita | H04N 5/23293 348/229.1 |
| 2010/0092151 A1 * | 4/2010 | Miyakoshi | H04N 5/145 386/343 |
| 2010/0157090 A1 * | 6/2010 | Kobayashi | H04N 5/77 348/222.1 |
| 2010/0214473 A1 * | 8/2010 | Kanai | G09G 5/363 348/452 |
| 2010/0271545 A1 | 10/2010 | Mori et al. | |
| 2011/0157318 A1 * | 6/2011 | Nalibotski | H04N 13/0048 348/47 |
| 2011/0227827 A1 * | 9/2011 | Solomon | G06F 3/0321 345/158 |
| 2012/0092443 A1 * | 4/2012 | Mauchly | H04N 7/15 348/14.12 |
| 2012/0092542 A1 * | 4/2012 | Kitano | H04N 5/23293 348/333.01 |
| 2012/0176537 A1 | 7/2012 | Nakamura et al. | |
| 2013/0162873 A1 * | 6/2013 | Sengoku | H04N 5/335 348/294 |
| 2013/0173938 A1 * | 7/2013 | Yang | G06F 1/26 713/300 |

FOREIGN PATENT DOCUMENTS

WO WO-0187377 A2 11/2001

* cited by examiner

*Primary Examiner* — Gene W Lee
(74) *Attorney, Agent, or Firm* — Harness, Dickey & Pierce

(57) ABSTRACT

In one embodiment, the converter is configured to receive a first sync signal from a display driver and to convert the first sync signal into a second sync signal. The second sync signal is for controlling image sensing.

16 Claims, 11 Drawing Sheets

1000

1100

1200

APPARATUSES, SYSTEMS, AND METHODS FOR CONVERTING A DISPLAY DRIVER SYNC SIGNAL INTO AN IMAGE SENSOR SYNC SIGNAL

CROSS-REFERENCE TO RELATED APPLICATION

This application claims priority from Korean Patent Application No. 10-2013-0105512 filed on Sep. 3, 2013 in the Korean Intellectual Property Office, and all the benefits accruing therefrom under 35 U.S.C. 119, the contents of which in its entirety are herein incorporated by reference.

BACKGROUND

Example embodiments relate to systems, system components, semiconductor devices and/or methods for operating the same.

Recently, as portability of an electronic product has become important, most portable electronic products are driven using batteries. However, as the size of a display included in an electronic product (for example, a display, such as LCD or OLED) is increased and the resolution is increased, a gradually increasing amount of power is required to display an image on the display.

Accordingly, methods for displaying a high-resolution image on a display while reducing power consumption are being actively researched.

SUMMARY

At least one embodiment relates to a converter.

In one embodiment, the converter is configured to receive a first sync signal from a display driver and to convert the first sync signal into a second sync signal. The second sync signal is for controlling image sensing.

In one embodiment, the first sync signal indicates a display frame rate.

In one embodiment, the second sync signal is for controlling an image sensing frame rate.

In one embodiment, the converter is configured to down convert the first sync signal to produce the second sync signal.

In one embodiment, the converter is configured to up convert the first sync signal to produce the second sync signal.

In one embodiment, the converter is configured to convert the first sync signal into the second sync signal based on conversion information.

The conversion information indicates at least one of a conversion ratio between the first and second sync signals, a timing difference between the first and second sync signals, a format difference between the first and second sync signals and a protocol difference between the first and second sync signals. The conversion information may be stored in a programmable memory of the converter.

In one embodiment, the converter is configured to generate the second sync signal such that the second sync signal has a different timing from the first sync signal.

In one embodiment, the converter is configured to generate the second sync signal such that the second sync signal has a different frequency from the first sync signal.

In one embodiment, the converter is configured to generate the second sync signal such that the second sync signal has a different format from the first sync signal.

In one embodiment, the converter is configured to generate the second sync signal such that the second sync signal conforms to a different protocol than the first sync signal.

At least one embodiment relates to an application processor.

In one embodiment, the application processor includes a first interface configured to interface with an image sensor, a second interface configured to interface with a display driver, and a converter configured to convert a first sync signal into a second sync signal. The first sync signal is received from the display driver, and the second sync signal is for controlling the image sensor.

In one embodiment, the first sync signal indicates a display frame rate of a display controlled by the display driver, and the second sync signal is for controlling an image sensing frame rate of the image sensor.

In one embodiment, the application processor further includes an image processing circuit configured to process image data received by the first interface. The image processing circuit is configured to supply the processed image data to the second interface.

In one embodiment, the application processor is configured to transfer image data received by the first interface to the second interface without storing the image data in memory separate from the application processor.

In one embodiment, application processor further includes a multimedia system configured to perform at least one multimedia function, and the multimedia system includes the converter.

In one embodiment, application processor further includes a central processing unit operationally connected to the multimedia system.

In one embodiment, the central processing unit includes a plurality of cores.

In one embodiment, application processor further includes a power management unit configured to control which of the plurality of cores is enabled.

In one embodiment, the application processor further includes a memory controller configured to interface with an external memory. The memory controller is operationally connected to the central processing unit and the multimedia system.

At least one embodiment relates to a system.

In one embodiment, the system includes a display driver configured to control a display; and a converter configured to receive a first sync signal from the display driver and to convert the first sync signal into a second sync signal. The second sync signal is for controlling image sensing.

In one embodiment, the display driver is configured to control a frame rate of the display, and the first sync signal indicates the frame rate.

In one embodiment, the display driver includes a first interface configured to receive image data, a second interface configured to interface with the display, and a buffer configured to buffer image data received by the first interface before supplying the image data to the second interface.

In one embodiment, the display driver further includes an encoder configured to encode the image data prior to storage in the buffer, and a decoder configured to decode the image data output from the buffer prior to supplying the image data to the second interface. In another embodiment, image data received by the first interface is encoded, and the display driver includes a decoder configured to decode the image data before supplying the image data to the second interface. Here, the display driver may further includes a buffer configured to buffer the image data received by the first interface, and the decoder is configured to decode the image data output from the buffer.

In one embodiment, the system further includes an image sensor configured to perform image sensing based on the second sync signal.

In one embodiment, the image sensor is configured to perform image sensing at an image sensing frame rate, and the image sensing frame rate is based on the second sync signal.

In one embodiment, the system includes an application processor configured to transfer image data from the image sensor to the display driver.

In one embodiment, the application processor includes the converter.

At least one embodiment relates to a method.

In one embodiment, the method includes receiving a first sync signal from a display driver, converting the first sync signal into a second sync signal where the second sync signal for controlling image sensing, and outputting the second sync signal to an image sensor.

In one embodiment, the first sync signal indicates a display frame rate of a display controlled by the display driver.

In one embodiment, the second sync signal is for controlling an image sensing frame rate.

In one embodiment, method further includes storing conversion information. The conversion information indicates a conversion ratio between the first sync signal and the second sync signal. Here, the converting converts the first sync signal into the second sync signal based on the conversion information.

BRIEF DESCRIPTION OF THE DRAWINGS

The above and other features and advantages of the example embodiments will become more apparent by describing in detail these embodiments with reference to the attached drawings in which.

DETAILED DESCRIPTION OF THE EMBODIMENTS

Figure 1:
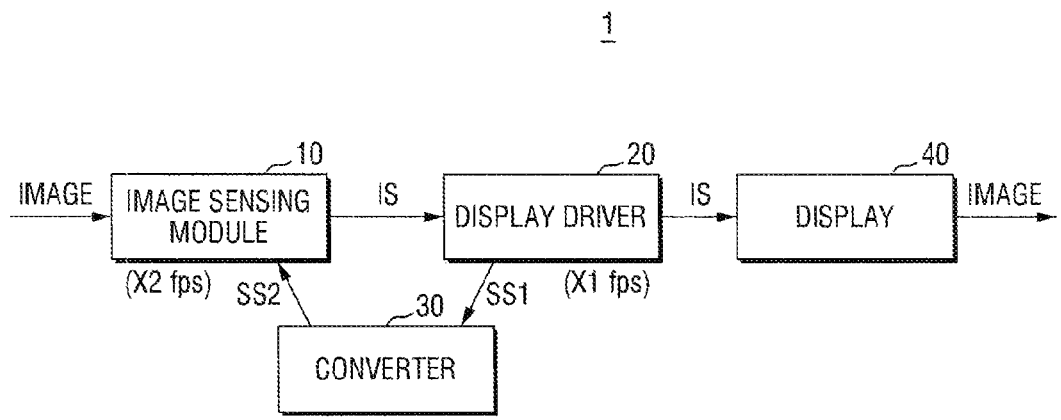
FIG. 1 is a block diagram of a system according to an example embodiment.

Embodiments will be described in detail with reference to the accompanying drawings. The example embodiment, however, may be embodied in various different forms, and should not be construed as being limited only to the illustrated embodiments. Rather, these embodiments are provided as examples so that this disclosure will be thorough and complete, and will fully convey the example embodiments to those skilled in the art. Accordingly, known processes, elements, and techniques are not described with respect to some of the embodiments. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concepts belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Hereinafter, a system according to an example embodiment will now be described with reference to FIGS. 1 to 3.

Figure 2:
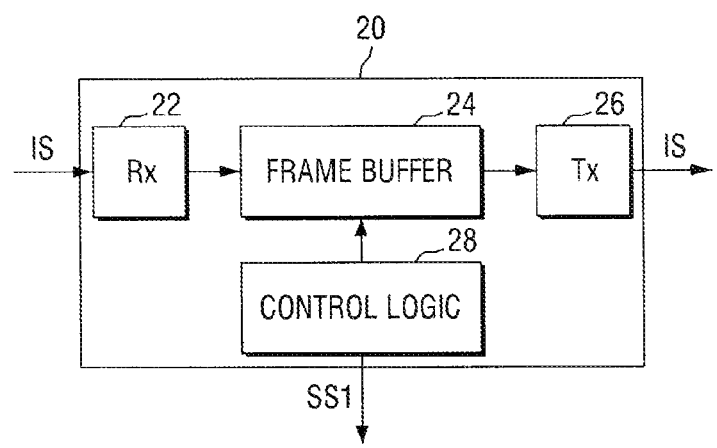
FIG. 2 is an example block diagram of a display driver shown in FIG. 1.
Figure 3:
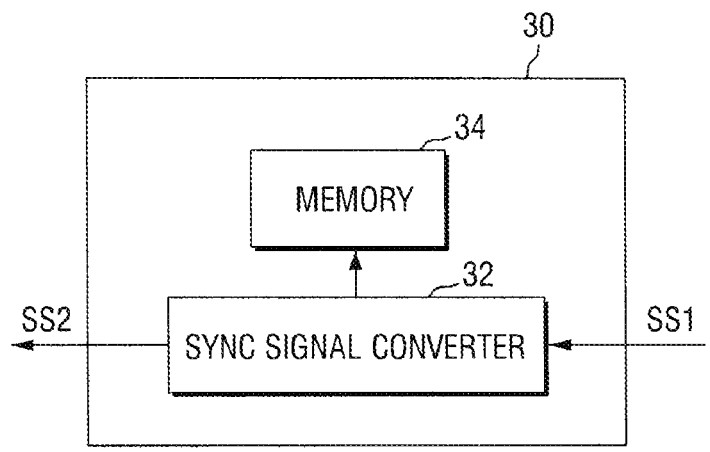
FIG. 3 is an example block diagram of a converter shown in FIG. 1.

FIG. 1 is a block diagram of a system according to an example embodiment, FIG. 2 is an example block diagram of a display driver shown in FIG. 1 and FIG. 3 is an example block diagram of a converter shown in FIG. 1.

Referring to FIG. 1, the system 1 includes an image sensing module 10, a display driver 20, a converter 30, and a display 40.

The display driver 20 may output an image signal (IS) to the display 40 at a first frame rate (X1) as indicated by a first sync signal (SS1). An image may be output on the display 40 receiving the image signal IS from the display driver 20 at the first frame rate X1.

In some embodiments, the display driver 20 may be, for example, a display driving IC (DDI), and the display 40 may be, for example, a liquid crystal display (LCD) or an organic light emitting diode (OLED).

In some other embodiments, the first sync signal SS1 may be a vertical sync signal used in outputting the image signal IS at the first frame rate X1. The vertical sync signal may be generated whenever an image of a frame is displayed on the display 40, but aspects of the example embodiments are not limited thereto. Any signal that can be generated whenever an image of a frame is displayed on the display 40 may be used as the first sync signal SS1.

Referring to FIG. 2, the display driver 20 may include a receiver (Rx) 22, a frame buffer 24, a transmitter (Tx) 26, and control logic 28.

The receiver (Rx) 22 may receive the image signal IS from an external device (for example, the image sensing module 10 shown in FIG. 1). In some embodiments, the receiver (Rx) 22 may employ a high speed serial interface. In detail, the receiver (Rx) 22 may employ a mobile industry processor interface (MIPI), but aspects of the example embodiments are not limited thereto. For example, the interface may be LVDS (low voltage differential signaling), DVI (digital visual interface), HDMI (high-definition multimedia interface), DP (display port), SVDL (scalable versatile data link), etc.

In some embodiments, the image signal IS input to the receiver (Rx) 22 may be, for example, an image signal sensed by the image sensing module (10 of FIG. 1) or an image signal obtained by performing a required image processing on the image sensed by the image sensing module (10 of FIG. 1) using a separate image processing module (not shown). That is to say, in the illustrated embodiment, a processed or pre-processed image signal may not be precluded from being used as the image signal IS input to the receiver (Rx) 22.

The frame buffer 24 may buffer the image signal IS provided from the image sensing module (10 of FIG. 1). The image buffered by the frame buffer 24 is synchronized with the first sync signal SS1 to then be output to the transmitter (Tx) 26.

In some embodiments, a graphic RAM (GRAM), for example, may be used as the frame buffer 24. If the graphic RAM (GRAM) is employed in the display driver 20, whenever the vertical sync signal used as the first sync signal SS1 is generated, the image signal stored in the graphic RAM (GRAM) may be output to the transmitter (Tx) 26, but aspects of the example embodiments are not limited thereto.

A configuration of the frame buffer 24 may be modified. For example, in some other embodiments, a register consisting of a plurality of flip-flops may be used as the frame buffer 24. Here, the register may be configured to store an image corresponding to an image of one frame output to the display 40.

The transmitter (Tx) 26 may receive the image signal IS provided from the frame buffer 24 and may output the same to the external device (for example, the display 40 of FIG. 1). In some embodiments, like the receiver (Rx) 22, the transmitter (Tx) 26 may also employ a high speed serial interface. In detail, the transmitter (Tx) 26 may employ RSDS (reduce swing differential signaling), mini-LVDS, PPDS (point-to-point differential signaling), AiPi (advanced intra panel interface), eRVDS (enhanced reduced voltage signaling), etc.; but, aspects of the example embodiments are not limited thereto.

The control logic 28 may control the frame buffer 24 to output the image signal IS buffered by the frame buffer 24 at the first frame rate X1 according to the first sync signal SS1. In the illustrated embodiment, the control logic 28 and the frame buffer 24 are separately provided, but aspects of the example embodiments are not limited thereto. That is to say, in some embodiments, the control logic 28 and the frame buffer 24 may be integrated.

Meanwhile, as shown, the first sync signal SS1 generated from the control logic 28 may be output to the outside of the display driver 20. Accordingly, the display driver 20 may include a terminal disposed therein, the terminal outputting the internally generated first sync signal SS1 to outside of the display driver 20.

In the above-described embodiment, an example configuration of the display driver 20 has been illustrated with reference to FIG. 2, but the example embodiments are not limited the configuration of the display driver 20 illustrated in FIG. 2. The configuration of the display driver 20 may be modified differently from that shown in FIG. 2.

Referring back to FIG. 1, the converter 30 may receive the first sync signal SS1 from the display driver 20 and may convert the same into a second sync signal (SS2), which may be different from first sync signal SS1.

In some embodiments, the converter 30 may convert the first sync signal SS1 into the second sync signal SS2 by skipping a portion of the first sync signal SS1, for example. In detail, when a conversion ratio defined by a user is 2:1, for example, the converter 30 may skip even-numbered pulses of the first sync signal SS1 to convert the first sync signal SS1 into the second sync signal SS2, which will later be described in detail.

In addition, in some other embodiments, the converter 30 may convert the first sync signal SS1 into the second sync signal SS2 by adding pulses to the first sync signal SS1, for example. In detail, when the conversion ratio defined by the user is 1:2, for example, the converter 30 may add one new pulse per each frame to reduce a cycle of the first sync signal SS1 to half; and thus, to convert the first sync signal SS1 into the second sync signal SS2.

Hereinafter, an example configuration of the converter 30 will be described with reference to FIG. 3, but aspects of the example embodiments are not limited thereto. The configuration of the converter 30 may be modified differently from that shown in FIG. 3.

As shown in FIG. 3, the converter 30 may include a sync signal converter 32 and a memory 34. The sync signal converter 32 receives the first sync signal SS1, and converts the first sync signal into the second sync signal SS2 based on conversion information to generate the second sync signal SS2. The conversion information may indicate the conversion ratio, timing difference, format difference and/or protocol difference between the first sync signal SS1 and the second sync signal SS2. The conversion information may be stored in the memory 34, and may be user defined. For example, the memory 34 may be a programmable non-volatile memory; but the embodiments are not limited to this implementation.

The sync signal converter 32 may perform, for example, down conversion or up conversion to generate the second sync signal SS2 from the first sync signal SS1. For example, if the conversion ratio is 2:1, then the sync signal converter 32 decreases the frequency of the first sync signal SS1 by half to generate the second sync signal SS2. For example, assume the first and second sync signals SS1 and SS2 are periodic signals. Then, for a conversion ratio of 2:1, the period between pulses of the first sync signal SS1 is doubled to generate the second sync signal SS2. FIG. 4B illustrates the first and second sync signals SS1 and SS2 according to this example. As another, example, if the conversion ratio is 1:2, then the sync signal generator 32 increases the frequency of the first sync signal SS1 by two to generate the second sync signal SS2. Stated another way, the period between pulses of the first sync signal SS1 is halved to generate the second sync signal SS2. FIG. 4C illustrates the first and second sync signals SS1 and SS2 according to this example.

Instead of or in addition to changing the frequency of the second sync signal SS2 with respect to the first sync signal SS1, the sync signal converter 32 may also change the timing, the format, and/or the protocol. These changes are indicated by the conversion information stored in the memory 34. As will be appreciated, the sync signal converter 32 may include a signal analyzer that analyzes the first sync signal SS1, and a signal generator that generates the second sync signal SS2 based on the analysis and the conversion information.

Referring again to FIG. 1, the image sensing module 10 may receive the second sync signal SS2 from the converter 30 and may sense an image at a second frame rate X2 different from the first frame rate X1. In some embodiments, the second frame rate X2 may be less than the first frame rate X1. In detail, for example, as described above, when the conversion ratio is 2:1, the image sensing module 10 may sense the image at the second frame rate X2, which is half the first frame rate X1. In more detail, for example, as described above, when the conversion ratio is 2:1, the first frame rate X1 may be 60 fps (frame per second) and the second frame rate X2 may be 30 fps, but aspects of the example embodiments are not limited thereto.

As described above, the image sensing module 10 may receive the second sync signal SS2 from the converter 30 and may perform an image sensing operation based on the second sync signal SS2. Therefore, the image sensing module 10 may include a terminal disposed therein, the terminal receiving the second sync signal SS2 from an external device (for example, the converter 30).

In some embodiments, the image sensing module 10 may be, for example, a camera module, but aspects of the example embodiments are not limited thereto.

Hereinafter, the operation of the system according to an embodiment will be described with reference to FIGS. 1 to 4B.

Figure 4A:
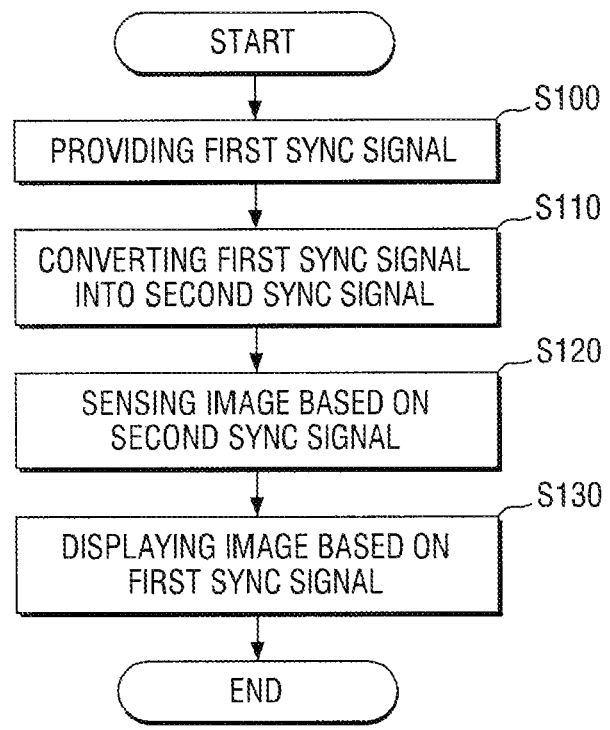
FIG. 4A is a flowchart illustrating a method for operating the system shown in FIG. 1 according to an example embodiment.
Figure 4B:
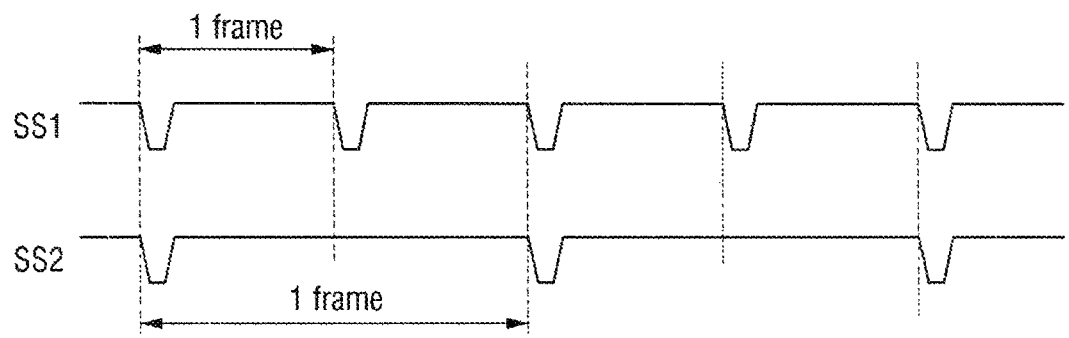
FIG. 4B illustrates a process of converting a first sync signal into a second sync signal according to an example embodiment.
Figure 4C:
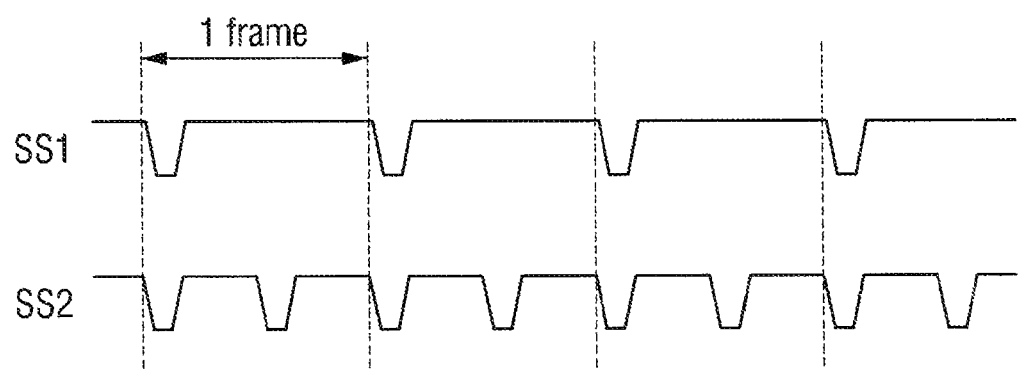
FIG. 4C illustrates another process of converting a first sync signal into a second sync signal according to an example embodiment.

FIG. 4A is a flowchart illustrating a method for operating the system shown in FIG. 1 according to an example embodiment, FIG. 4B illustrates a process of converting a first sync signal into a second sync signal and FIG. 4C illustrates another a process of converting a first sync signal.

Referring first to FIG. 4A, the first sync signal SS1 is provided (S100). The first sync signal SS1 may be generated by, for example, the control logic 28 of the display driver 20.

In some embodiments, the first sync signal SS1 may be a vertical sync signal used in displaying an image on the display 40 at the first frame rate X1, but aspects of the example embodiments are not limited thereto, as described above.

Referring again to FIG. 4A, the first sync signal SS1 is converted into a second sync signal SS2 (S110). In some embodiments, the converting may be performed by the converter 30. In the following description, the method for operating the system according to the embodiment will be described by way of example with regard to a case where the conversion ratio between the first sync signal SS1 and the second sync signal SS2, defined by the user, is 2:1.

Referring again to FIG. 4A, an image is sensed based on the second sync signal SS2 (S120). In some embodiments, the sensing operation may be performed by the image sensing module 10. Since image sensing is performed based on the second sync signal SS2, the image sensing module 10 may sense the image at the second frame rate X2 different from the first frame rate X1.

As shown in FIG. 4B, the frame rate of the image sensed or output based on the second sync signal SS2 may be half of the image sensed or output based on the first sync signal SS1. Therefore, the image sensing module 10 may sense the image at the second frame rate X2, which is half the first frame rate X1. In some embodiments, the first frame rate X1 may be 60 fps and the second frame rate X2 may be 24 fps or 30 fps, but aspects of the example embodiments are not limited thereto.

Referring again to FIG. 4A, the sensed image is displayed based on the first sync signal SS1 (S130), which will now be described in more detail.

First, as described above, the image sensing module 10 senses the image at the second frame rate X2 to generate an image signal IS. The thusly generated image signal IS is buffered by the frame buffer 24 after receipt through the receiver (Rx) 22 of the display driver 20.

In some embodiments, the image signal IS provided from the image sensing module 10 to the display driver 20 may be provided on the fly. In other words, while the image signal IS is provided from the image sensing module 10 to the display driver 20, the image signal IS is not separately stored in a memory, such as a DRAM.

Meanwhile, as described above, the image signal IS buffered with the frame buffer 24 of the display driver 20 is synchronized with the first sync signal SS1 by the control logic 28 to then be output to the transmitter (Tx) 26. Therefore, the image signal IS output from the display driver 20 may be output at the first frame rate X1 greater than the second frame rate X2.

The display driver 20 may output the image signal, which is sensed at the second frame rate X2, at the first frame rate X1 in the following manner.

For example, the display driver 20 may redundantly output the image signal IS buffered for each even-numbered frame. In detail, for example, when an image signal IS "ABC" is sensed by the image sensing module 10 for a time T, the display driver 20 outputs an image signal IS "AABBCC" for the same time period T to the display 40, thereby displaying the same image as the sensed image on the display 40.

The operation of the display driver 20 is not limited to the above-described example, and the operation of the display driver 20 may be modified in various manners.

In the above-described embodiment, the method for operating the system according to the embodiment has been described by way of example with regard to the case where the conversion ratio between the first sync signal SS1 and the second sync signal SS2 is 2:1. However, instead of down conversion, the converter 30 may perform up conversion. Such an example was described above and shown in FIG. 4C for the conversion ratio of 1:2.

In this example, since the image sensing module 10 performs image sensing based on the second sync signal SS2, the image sensing module 10 may sense the image at the second frame rate X2, which is two times greater than the first frame rate X1.

In detail, for example, when an image signal IS "ABC-DEF" is sensed by the image sensing module 10 for a time T, the display driver 20 outputs an image signal IS "ACE" for the same time period T to the display 40, thereby displaying the same image as the sensed image on the display 40.

As described above, the operation of the display driver 20 is not limited to the above-described example, and the operation of the display driver 20 may be modified in various manners.

Based on the above-described operating method of the system 1, one having ordinary skill in the related art will fully understand how the embodiment may be modified in cases when the conversion ratio between the first sync signal SS1 and the second sync signal SS2 is N:1, where N is a natural number, and 1:M, where M is a natural number, and detailed descriptions thereabout will be omitted.

According to the embodiment, when the image sensing module 10 performs image sensing using the sync signal generated in the display driver 20, a separate operation for synchronizing the image sensing module 10 and the display driver 20 is not required. Accordingly, the image signal IS provided from the image sensing module 10 is provided to the display driver on the fly.

However, if a separate operation for synchronizing the image sensing module 10 and the display driver 20 is required, unnecessary power consumption for the separate operation may be caused. For example, in order to synchronize the image sensing module 10 and the display driver 20, the image signal IS provided from the image sensing module 10 may be stored in a memory, for example, DRAM, to then be provided to the display driver 20. In such a case, unnecessary power consumption may be caused in operating the DRAM. In addition, if the DRAM is continuously used in displaying the sensed image, the use of the DRAM may be inefficient in view of bandwidth.

In the system 1 according to the embodiment, since such an unnecessary operation in displaying the sensed image is omitted, power consumption of the system 1 may be reduced.

A system according to another embodiment will be described with reference to FIG. 5.

Figure 5:
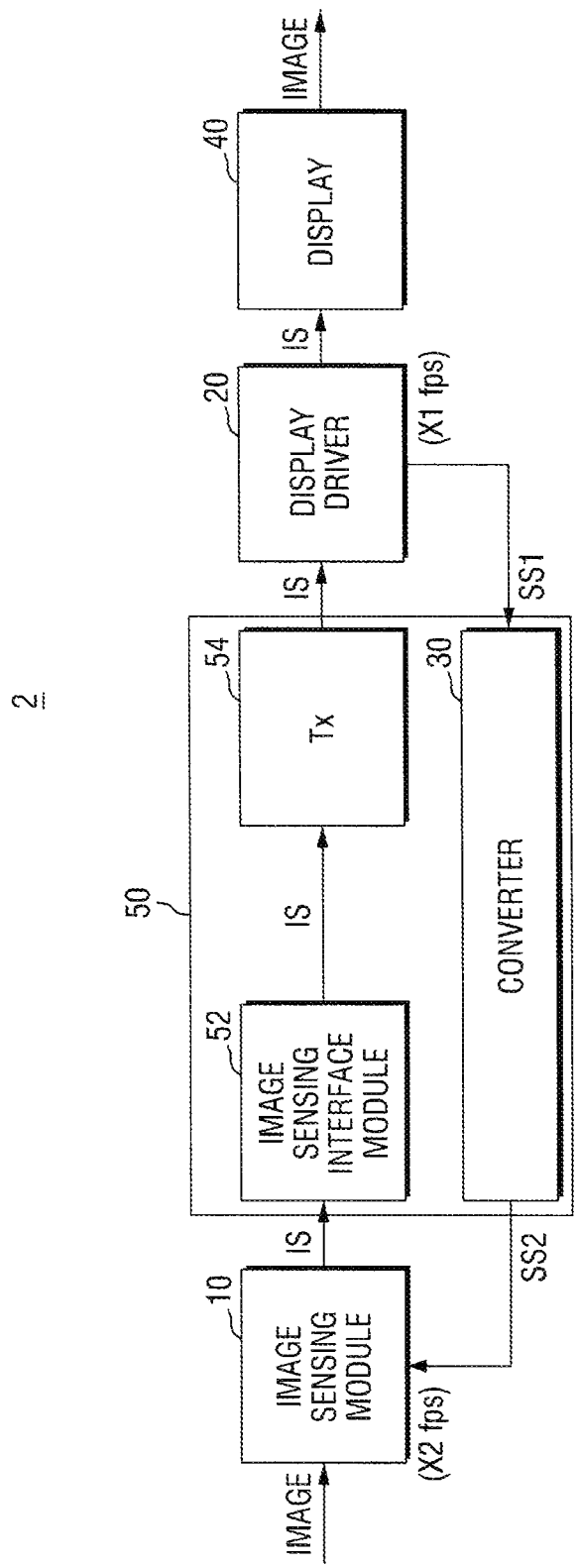
FIG. 5 is a block diagram of a system according to another example embodiment.

FIG. 5 is a block diagram of a system according to another example embodiment Details which are the same as those described in the above-described embodiments will be omitted, and the following description will focus on differences between the present and previous embodiments.

Referring to FIG. 5, in the system 2, the converter 30 may be disposed within an application processor (AP) 50. Here, an image sensing module 10, a display driver 20, and a display 40 may be disposed outside the AP 50, as shown in FIG. 5.

Meanwhile, the AP 50 may further include an image sensing interface module 52 and a transmitter 54, in addition to the converter 30.

The image sensing interface module 52 may receive an image signal IS input from an external device (for example, the image sensing module 10 of FIG. 1). In some embodiments, the image sensing interface module 52 may employ a high speed serial interface. In detail, the image sensing interface module 52 may employ a mobile industry processor interface (MIPI), but aspects of the example embodiments are not limited thereto. For example, the interface may be LVDS (low voltage differential signaling), DVI (digital visual interface), HDMI (high-definition multimedia interface), DP (display port), SVDL (scalable versatile data link), etc.

Meanwhile, the image sensing interface module 52 may perform image signal processing (ISP) on the image signal provided from the image sensing module 10. In this case, a separate circuit for performing the ISP may be disposed in the image sensing interface module 52.

The transmitter 54 disposed in the AP 50 may output the image signal IS output from image sensing interface module 52 to an external device (for example, the display driver 20). In some embodiments, like the image sensing interface module 52, the transmitter (Tx) 54 may also employ a high speed serial interface. In detail, the transmitter (Tx) 54 may employ a mobile industry processor interface (MIPI), but aspects of the example embodiments are not limited thereto. For example, the transmitter (Tx) 26 may employ RSDS (reduce swing differential signaling), mini-LVDS, PPDS (point-to-point differential signaling), AiPi (advanced intra panel interface), eRVDS (enhanced reduced voltage signaling), etc.; but, aspects of the example embodiments are not limited thereto.

Hereinafter, a system according to still another example embodiment will be described with reference to FIGS. 6 and 7.

Figure 6:
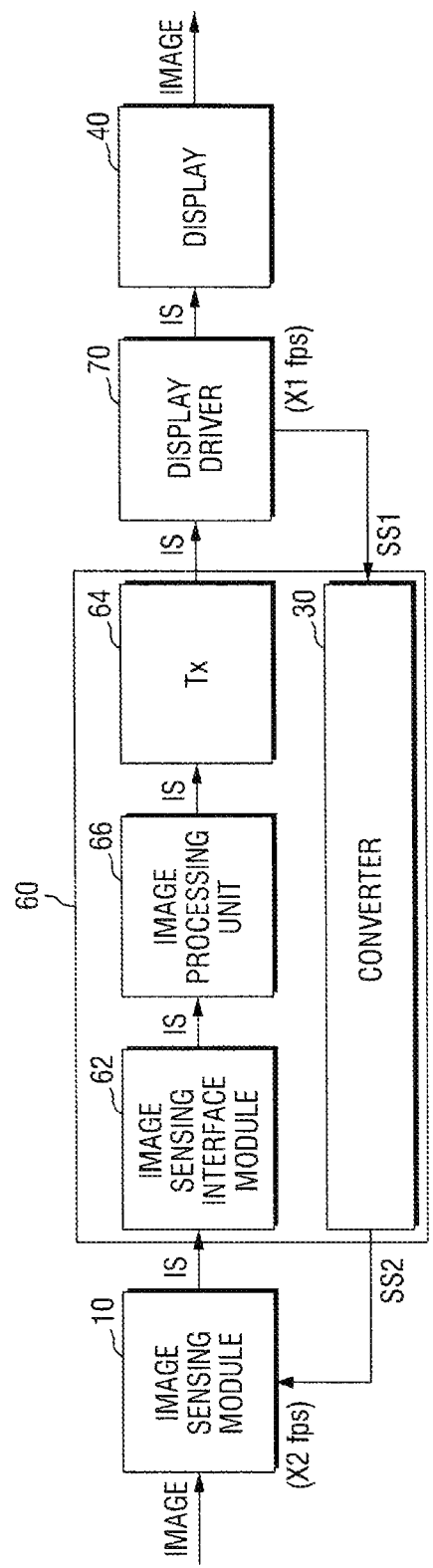
FIG. 6 is a block diagram of a system according to still another example embodiment.
Figure 7:
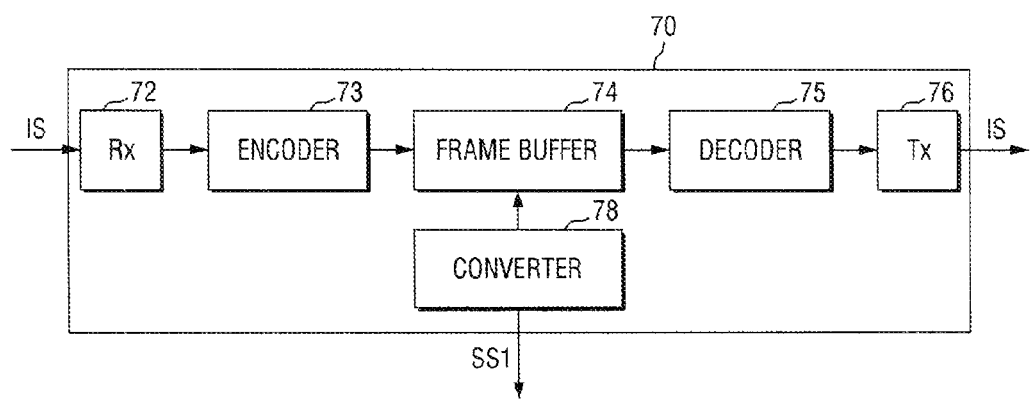
FIG. 7 is an example block diagram of a display driver shown in FIG. 6.

FIG. 6 is a block diagram of a system according to still another example embodiment and FIG. 7 is an exemplary block diagram of a display driver shown in FIG. 6. Details which are the same as those described in the above-described embodiments will be omitted, and the following description will focus on differences between the present and previous embodiments.

Referring to FIG. 6, in the system 3 according to still another embodiment, an application processor (AP) 60 may include converter 30, an image sensing interface module 62, a transmitter 64, and an image processing unit 66.

The converter 30, the image sensing interface module 62, and the transmitter 64 are the same as those of the previous embodiments, and repeated descriptions thereof will be omitted.

The image processing unit 66 may perform processing on the image signal provided from the image sensing interface module 62. The processing may be a processing operation for a subsequent encoding operation, which will later be described. Additionally, or alternatively, the processing operation may be color space conversion, blending, rotating, and/or etc.

Referring to FIG. 7, in the system 3, a display driver 70 may include a receiver 72, an encoder 73, a frame buffer 74, a decoder 75, a transmitter 76, and a control logic 78.

Here, the receiver 72, the frame buffer 74, the transmitter 76 and the control logic 78 are the same as those of the previous embodiments, and repeated descriptions thereof will be omitted.

The encoder 73 may encode an image signal IS according to any well-known encoding method. In detail, the encoder 73 may encode an image signal IS having a first frame rate X1 using a desired (or, alternatively a predetermined) encoding method, such as MPEG-4, or H.264. The encoded image signal is stored in the frame buffer 74. Because the amount of data stored has been reduced by the compression performed by the encoded, power consumption is reduced. The decoder 75 decodes the encoded image data output from the frame buffer 74. The decoded signal is supplied to the transmitter 76. Accordingly, an image may be displayed on the display 40.

Next, a system according to still another example embodiment will be described with reference to FIGS. 8A to 9.

Figure 8A:
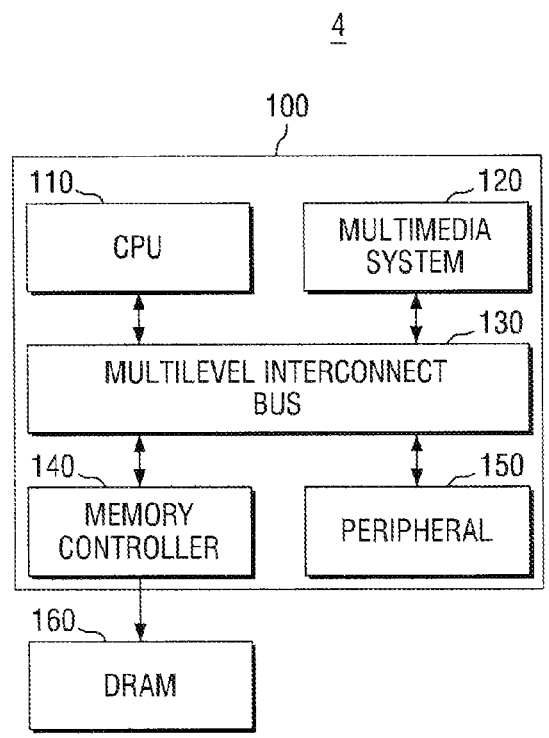
FIG. 8A is a block diagram of an application processor according to another example embodiment.
Figure 8B:
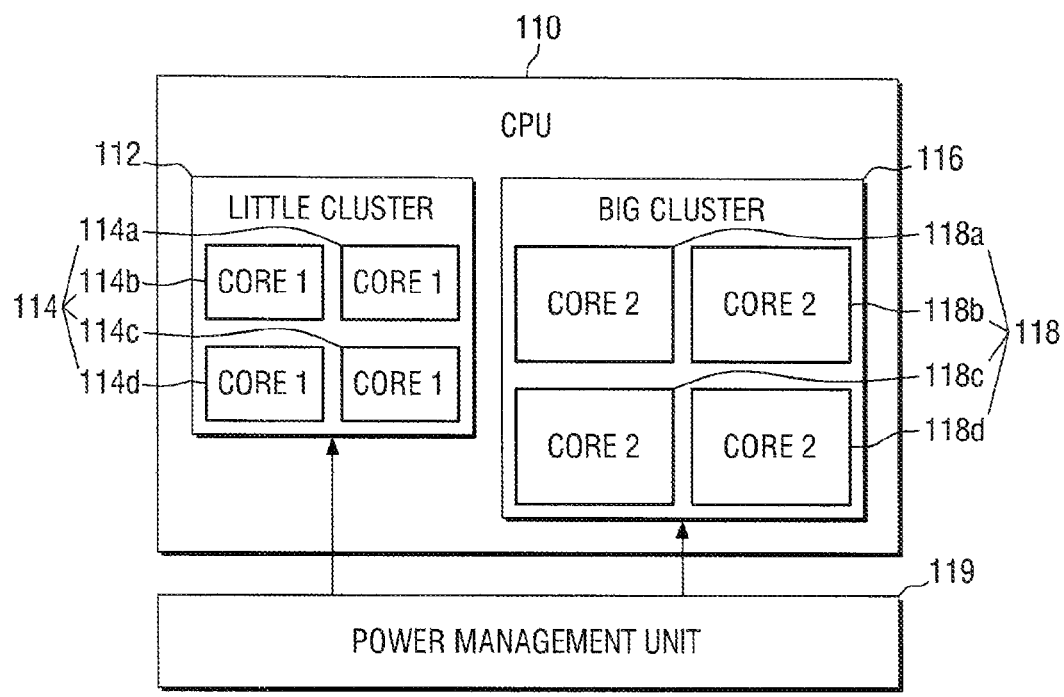
FIG. 8B is a schematic block diagram of a central processing unit shown in FIG. 8A.

FIG. 8A is a block diagram of a portion of a system according to still another example embodiment, and FIG. 8B is a schematic block diagram of a central processing unit shown in FIG. 8A. FIG. 9 illustrates a packaged state of the system shown in FIG. 8A.

Referring first to FIG. 8A, the system 4 may include an application processor (AP) 100 and a DRAM 160.

The AP 100 may include a central processing unit 110, a multimedia system 120, a bus 130, a memory controller 140, and a peripheral circuit 150.

The central processing unit 110 may perform operations for operating the system. In some embodiments, the central processing unit 110 may be configured in a multi-core environment including a plurality of cores.

Meanwhile, in some embodiments, the central processing unit 110 may be configured to include a first cluster 112 and a second cluster 116, as shown in FIG. 8B.

The first cluster 112 may be disposed within the central processing unit 110. The first cluster 112 may include n first cores 114 (Here, n is a natural number). For brevity, the first cluster 112 including 4 first cores 114a to 114d (i.e., n=4) is exemplified in FIG. 8B, but aspects of example embodiments are not limited thereto.

Like the first cluster 112, the second cluster 116 may also be disposed within the central processing unit 110 and may include n second cores 118. As shown, the second cluster 116 may be disposed to be separated from the first cluster 112. For brevity, the second cluster 116 including 4 second cores 118a to 118d (i.e., n=4) may be exemplified in the illustrated embodiment, but aspects of the example embodiments are not limited thereto.

While, FIG. 8B illustrates that the number of first cores 114 included in the first cluster 112 is equal to that of second cores 118 included in the second cluster 116, aspects of the example embodiments are not limited thereto. In some embodiments, the number of first cores 114 included in the first cluster 112 may be different from the number of second cores 118 included in the second cluster 116.

In addition, FIG. 8B illustrates that only the first cluster 112 and the second cluster 116 are disposed within in the central processing unit 110, but aspects of the example embodiments are not limited thereto. A third or additional clusters (not shown) distinguished from the first and second clusters 112 and 116 and including third or additional cores (not shown) may further be disposed within the central processing unit 110.

In the illustrated embodiment, a computing capacity per unit time performed by the first cores 114 included in the first cluster 112 may be different from a computing capacity per unit time performed by the second cores 118 included in the second cluster 116.

In some embodiments, the first cluster 112 may be, for example, a little cluster, and the second cluster 116 may be, for example, a big cluster. In this case, the computing capacity per unit time performed by the first cores 114 included in the first cluster 112 may be smaller than the computing capacity per unit time performed by the second cores 118 included in the second cluster 116.

Therefore, the computing capacity per unit time in a case where all of the first cores 114 included in the first cluster 112 are enabled and perform computations may be smaller than the computing capacity per unit time in a case where all of the second cores 118 included in the second cluster 116 are enabled and perform computations.

Meanwhile, in the illustrated embodiment, first_first to first_fourth cores 114a to 114d included in the first cluster 112 may have the same computing capacity performed per unit time, and second_first to second_fourth cores 118a to 118d included in the second cluster 116 may have the same computing capacity performed per unit time. That is to say, for example, assuming that computing capacity per unit time of each of the first_first to first_fourth cores 114a to 114d is 10, the computing capacity per unit time of each of the second_first to second_fourth cores 118a to 118d may be 40.

A power management unit 119 may enable or disable the first cluster 112 and the second cluster 116. In detail, when a computation is to be performed by the first cluster 112, the power management unit 119 enables the first cluster 112 while disabling the second cluster 116. Conversely, when a computation is to be performed by the second cluster 116, the power management unit 119 enables the second cluster 116 while disabling the first cluster 112. In addition, if the computing capacity to be performed is very well processed using only the first_first core 114a included in the first cluster 112, the power management unit 119 enables the first cluster 112, specifically the first_first core 114a of the first cluster 112 while disabling the second cluster 116, specifically the first_second to first_fourth cores 114b to 114d of the second cluster 116. In other words, the power management unit 119 according to the embodiment may determine whether to enable both of the first and second clusters 112 and 116 or may determine whether to enable each of the first_first to first_fourth cores 114a to 114d included in the first cluster 112 and each of the second_first to second_fourth cores 118a to 118d.

In some embodiments, the enabling of the first and second clusters 112 and 116 and/or the plurality of cores 112a to 112d and 116a to 116d included in the first and second clusters 112 and 116 may include operating the first and second clusters 112 and 116 and/or the plurality of cores 112a to 112d and 116a to 116d by supplying power to the first and second clusters 112 and 116 and/or the plurality of cores 112a to 112d and 116a to 116d. In addition, the disabling of the first and second clusters 112 and 116 and/or the plurality of cores 112a to 112d and 116a to 116d included in the first and second clusters 112 and 116 may include interrupting the operating of the first and second clusters 112 and 116 and/or the plurality of cores 112a to 112d and 116a to 116d by blocking power supplied to the first and second clusters 112 and 116 and/or the plurality of cores 112a to 112d and 116a to 116d.

The power management unit 119 may enable only the clusters 112 and 116 and/or the plurality of cores 112a to 112d and 116a to 116d included in the clusters 112 and 116 according to the operating environment of the system 4, thereby managing power consumption of the overall system 4.

Referring again to FIG. 8A, the multimedia system 120 may be used in performing a variety of multimedia functions in the system 4. The multimedia system 120 may include a 3D engine module, a video codec, a display system, a camera system, and/or a post-processor.

In some embodiments, in the systems 1 to 3 according to the above-described embodiments, the converter 30, the image sensing interface modules 52 and 62, and the image processing unit 66 may be provided as components of the multimedia system 120.

The bus 130 may be used in performing data communication among the central processing unit 110, the multimedia system 120, the memory controller 140, and the peripheral circuit 150. In some embodiments, the bus 130 may have a multi-layered structure. In detail, examples of the bus 130 may include a multi-layer advanced high-performance bus (AHB), or a multi-layer advanced eXtensible interface (AXI), but aspects of the example embodiments are not limited thereto.

The memory controller 140 may provide environments for high-speed operation by connecting the AP 100 to an external memory (for example, the DRAM 160). In some embodiments, the memory controller 140 may include a separate controller (for example, a DRAM controller) for controlling the external memory (for example, the DRAM 160).

The peripheral circuit 150 may provide environments for smoothly connecting the system 4 to an external device (for example, a main board). Accordingly, the peripheral circuit 150 may include various kinds of interfaces enabling the external device connected to the system 4 to be compatibly used.

The DRAM 160 may function as a working memory to operate the AP 100. In some embodiments, as shown, the DRAM 160 may be disposed outside the AP 100. In detail, the DRAM 160 may be packaged with the AP 100 in the form of a package on package (PoP) shown in FIG. 9.

Figure 9:
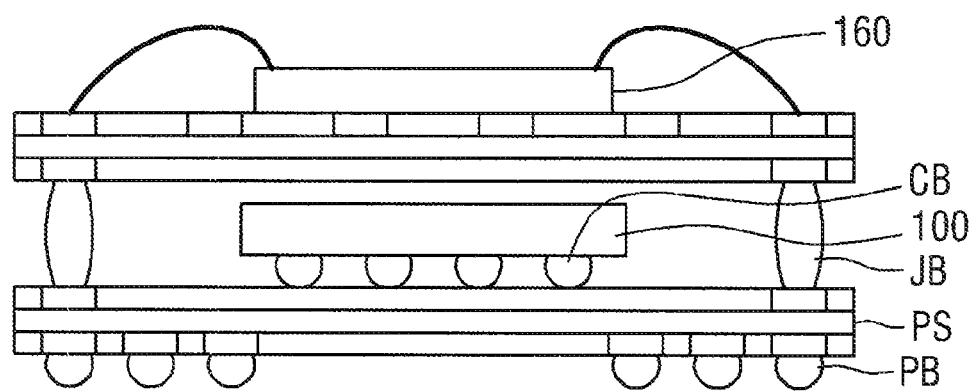
FIG. 9 illustrates a packaged state of the application processor shown in FIG. 8A.

Referring to FIG. 9, the semiconductor package may include a package substrate (PS), a DRAM 160, and an application processor (AP) 100.

The package substrate (PS) may include a plurality of package balls (PBs). The plurality of package balls (PBs) may be electrically connected to chip balls (CBs) of the AP 100 through signal lines provided in the package substrate (PS). In addition, the plurality of package balls (PBs) may also be electrically connected to joint balls (JBs) through the signal lines provided in the package substrate (PS).

Meanwhile, as shown in FIG. 9, the DRAM 160 may be electrically connected to the joint balls (JBs) by wire bonding.

The AP 100 may be disposed under the DRAM 160. The chip balls CBs of the AP 100 may be electrically connected to the DRAM 160 through the joint balls (JBs).

Meanwhile, FIG. 8A illustrates that the DRAM 160 is disposed outside the AP 100, but aspects of the example embodiments are not limited thereto. The DRAM 160 may also be disposed within the AP 100 as well.

Next, an example electronic system employing systems according to some embodiments will be described with reference to FIG. 10.

Figure 10:
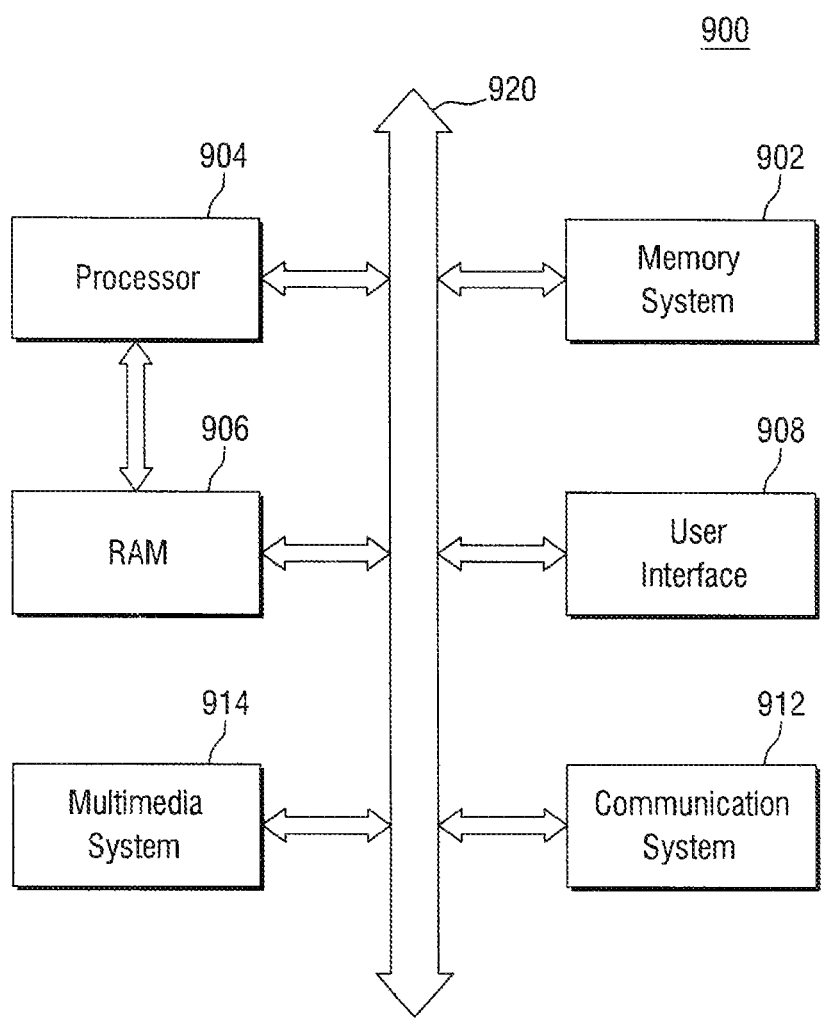
FIG. 10 is a block diagram of an example electronic system employing one or more system elements according to some embodiments.

FIG. 10 is a block diagram of an exemplary electronic system employing systems according to some embodiments.

Referring to FIG. 10, the electronic system 900 may include a memory system 902, a processor 904, a RAM 906, a user interface 908, a communication system 912 and a multimedia system 914.

The memory system 902, the processor 904, the RAM 906, the user interface 908, the communication system 912 and the multimedia system 914 may perform data communication with one another using a bus 920.

The processor 904 may execute a program and may control the electronic system 900. The processor 904 may include at least one of a microprocessor, a digital signal processor, a microcontroller, and logic elements. The logic elements may be configured to perform the same functions as any of the foregoing elements. In some embodiments, the processor 904 may include a working cache, such as L1 or L2, for improving the operating speed.

The RAM 906 may be used as a working memory of the processor 904. The RAM 906 may include, for example, a volatile memory, such as a DRAM.

Meanwhile, the processor 904 and RAM 906 may be packaged into one semiconductor device or a semiconductor package. In some embodiments, the processor 904 and RAM 906 may be packaged in the form of a package on package (PoP), but aspects of the example embodiments are not limited thereto.

The user interface 908 may be used to input/output data to/from the electronic system 900. Examples of the user interface 908 may include a keypad, a keyboard, a touch sensor, a camera module, a display device, and so on.

The user interface 908 may be implemented in the electronic system 900 as an independent system. For example, a keypad, a keyboard, a camera module, and a touch sensor may be implemented as an input system, and a display device may be implemented as a display system.

The input system may include the image sensing module 10 of the systems 1 to 3. The display system may include the display driver 20 or 70 of the systems 1 to 3.

The memory system 902 may include one or more nonvolatile memory devices for storing codes for operating the processor 904, data processed by the processor 904 or externally input data. The memory system 902 may include a separate driving controller.

The controller may be configured to be connected to the host and the nonvolatile memory device. The controller may access the nonvolatile memory device at a request from the host.

For example, the controller may control read, write, erase, and background operations of the nonvolatile memory device.

The controller provides interfacing between the nonvolatile memory device and the host. The controller may drive firmware for controlling the nonvolatile memory device.

As an example, the controller may further include well-known components, such as a random access memory (RAM), a processing unit, a host interface, a memory interface, or the like. The RAM may be used as at least one of a working memory of the processing unit, a cache memory between the nonvolatile memory device and the host, and a buffer memory between the nonvolatile memory device and the host. The processing unit controls the overall operation of the controller.

The host interface includes a protocol for data exchange between a host and the controller. For example, the controller may be configured to communicate with an external device (host) through one of various standardized interface protocols such as Universal Serial Bus (USB), Multimedia Card (MMC), Peripheral Component Interconnection (PCI), PCI- Express (PCI-E), Advanced Technology Attachment (ATA, Parallel-ATA, pATA), Serial-ATA (SATA), Small Computer Small Interface (SCSI), Enhanced Small Disk Interface (ESDI), and Integrated Drive Electronics (IDE). The memory interface is configured to interface with the nonvolatile memory device. For example, the memory interface includes NAND interface or a NOR interface.

The memory system 902 may be configured to additionally include an error correction block. The error correction block may be configured to detect an error of data read from a memory device and to correct the detected error using an error correction code (ECC). As an example, the error correction block may be provided as a component of the controller. Alternatively, the error correction block may also be provided as a component of the nonvolatile memory device.

Meanwhile, an example nonvolatile memory, that is, a flash memory, may be mounted in an information processing system, such as a mobile device or a desktop computer, as the memory system 902. As another example, the flash memory may be integrated into one semiconductor device to form a solid state disk/drive (SSD). In this case the electronic system 900 may stably store large-capacity data in the flash memory.

Meanwhile, the memory system 902 may be integrated into a single semiconductor device. As an example, the memory system 902 may be integrated as one semiconductor device to configure a memory card. For example, the memory system 902 may be integrated as one semiconductor device to configure a PC card (for example, PCMCIA), a compact flash card (CF), a smart media card (SM/SMC), a memory stick, a multimedia card (for example, MMC, RS-MMC and MMC-micro), an SD card (for example, SD, miniSD and microSD), and a universal flash memory device (for example, UFS).

As an example, the memory system 902 may be mounted in various types of packages. Examples of the packages of the memory system 902 may include Package on Package (PoP), Ball Grid Arrays (BGAs), Chip Scale Packages (CSPs), Plastic Leaded Chip Carrier (PLCC), Plastic Dual In-line Package (PDIP), Die in Waffle Pack, Die in Wafer Form, Chip On Substrate (COB), Ceramic Dual In-line Package (CERDIP), Plastic Metric Quad Flat Pack (MQFP), Thin Quad Flat Pack (TQFP), Small Outline Integrated Circuit (SOIC), Shrink Small Outline Package (SSOP), Thin Small Outline Package (TSOP), Thin Quad Flatpack (TQFP), System In Package (SIP), Multi Chip Package (MCP), Wafer-level Fabricated Package (WFP), and Wafer-Level Processed Stack Package (WSP).

A communication system 912 may be a system processing a communication process between the electronic system 900 and an external device. A multimedia system 914 may be a system performing various multimedia processing operations in the electronic system 900. The multimedia system 914 may include, for example, a graphic engine, a video codec, a camera module, and so on.

In the systems 1 to 3 according to some embodiments, the converter 30, the image sensing interface modules 52 and 62, and the image processing unit 66 may be provided as components of the multimedia system 914.

Figure 11:
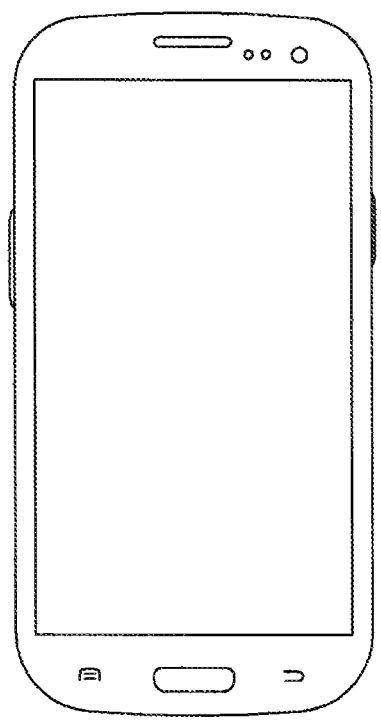
FIG. 11 illustrates an application example in which the electronic system shown in FIG. 10 is applied to a smart phone.

The electronic system 900 shown in FIG. 10 may be applied to electronic controllers of a variety of electronic devices. FIG. 11 illustrates an application example in which the electronic system 900 of FIG. 10 is applied to a smart phone 1000. In such a manner, when the electronic system (900 of FIG. 10) is applied to the smart phone 1000, the electronic system (900 of FIG. 10) or a part of the electronic system (900 of FIG. 10) may include an application processor implemented in the form of a system on chip (SoC).

Figure 12:
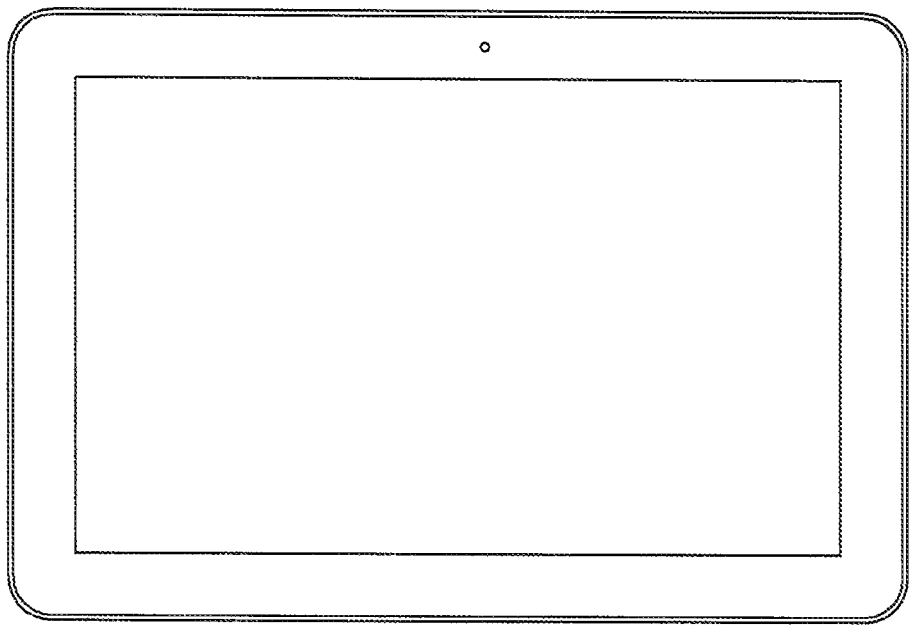
FIG. 12 illustrates an application example in which the electronic system shown in FIG. 10 is applied to a tablet PC.
Figure 13:
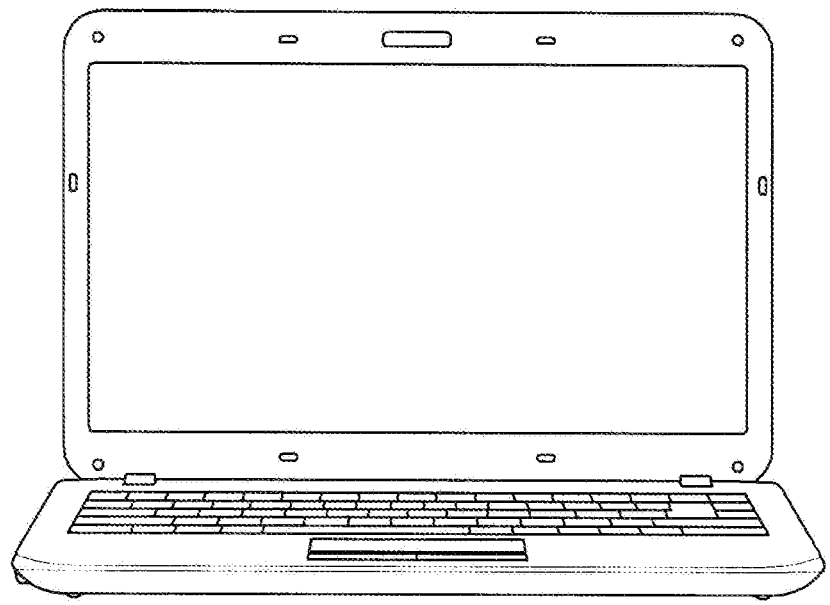
FIG. 13 illustrates an application example in which the electronic system shown in FIG. 10 is applied to a notebook computer.

Meanwhile, the electronic system (900 of FIG. 10) may also be applied to other types of electronic devices. FIG. 12 illustrates an application example in which the electronic system 900 of FIG. 10 is applied to a tablet PC 1100. FIG. 13 illustrates an application example in which the electronic system 900 of FIG. 10 is applied to a notebook computer 1200.

In addition, the electronic system (900 of FIG. 10) may comprise or be incorporated in a computer, an ultra mobile personal computer (UMPC), a work station, a net-book, a personal digital assistant (PDA), a portable computer, a web tablet, a wireless phone, a mobile phone, a smart phone, an e-book, a portable multimedia player (PMP), a portable game console, a navigation device, a black box, a digital camera, a 3-dimensional television, a digital audio recorder, a digital audio player, a digital picture recorder, a digital picture player, digital video recorder, a digital video player, a device capable of transmitting/receiving information in wireless environments, one of various electronic devices constituting a home network, one of various electronic devices constituting a computer network, one of various electronic devices constituting a telematics network, RFID devices, or embedded systems, but not limited thereto.

If the electronic system (900 of FIG. 10) is a wireless communicable apparatus, it may be used in a communication system such as code division multiple access (CDMA), global system for mobile communication (GSM), North American digital cellular (NADC), enhanced-time division Multiple access (E-TDMA), a wideband code division multiple access (WCDAM), and CDMA2000.

While the present invention has been particularly shown and described with reference to example embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A converter configured to receive a first sync signal from a display driver that is physically separate from the converter, and to convert the first sync signal into a second sync signal based on conversion information, the second sync signal for controlling image sensing, the converter including a programmable memory configured to store the conversion information.

2. The converter of claim 1, wherein the conversion information indicates at least one of a conversion ratio between the first and second sync signals, a timing difference between the first and second sync signals, a format difference between the first and second sync signals and a protocol difference between the first and second sync signals.

3. The converter of claim 1, wherein the first sync signal indicates a display frame rate.

4. The converter of claim 3, wherein the second sync signal is for controlling an image sensing frame rate.

5. The converter of claim 4, wherein the converter is configured to down convert the first sync signal to produce the second sync signal.

6. The converter of claim 4, wherein the converter is configured to up convert the first sync signal to produce the second sync signal.

7. The converter of claim 4, wherein the converter is configured to generate the second sync signal such that the second sync signal has a different timing from the first sync signal.

8. The converter of claim 4, wherein the converter is configured to generate the second sync signal such that the second sync signal has a different frequency from the first sync signal.

9. The converter of claim 4, wherein the converter is configured to generate the second sync signal such that the second sync signal has a different format from the first sync signal.

10. The converter of claim 4, wherein the converter is configured to generate the second sync signal such that the second sync signal conforms to a different protocol than the first sync signal.

11. An application processor, comprising:
a first interface configured to interface with an image sensor;
a second interface configured to interface with a display driver separated from the application processor; and
a converter configured to convert a first sync signal into a second sync signal, the first sync signal received from the display driver, and the second sync signal for controlling the image sensor,
wherein the application processor is configured to transfer image data received by the first interface to the second interface without storing the image data in a memory separate from the application processor.

12. The application processor of claim 11, wherein the first sync signal indicates a display frame rate of a display controlled by the display driver, and the second sync signal is for controlling an image sensing frame rate of the image sensor.

13. The application processor of claim 11, further comprising:
an image processing circuit configured to process image data received by the first interface and supply the processed image data to the second interface.

14. The application processor of claim 11, further comprising:
a multimedia system configured to perform at least one multimedia function, and the multimedia system including the converter.

15. The application processor of claim 14, further comprising:
a central processing unit operationally connected to the multimedia system.

16. The application processor of claim 15, wherein the central processing unit includes a plurality of cores, and the application processor further includes, a power management unit configured to control which of the plurality of cores is enabled.

* * * * *